United States Patent [19]

Ferris

[11] Patent Number: 4,693,112

[45] Date of Patent: Sep. 15, 1987

[54] AIR CONDITIONER REFRIGERANT CHECK GAUGE INSERT CONVERTIBLE TO A TIRE CHECK GAUGE

[76] Inventor: James E. Ferris, 15 High Mesa Pl., Richardson, Tex. 75080

[21] Appl. No.: 873,386

[22] Filed: Jun. 12, 1986

[51] Int. Cl.⁴ .......................... B60C 23/02; G01L 7/16
[52] U.S. Cl. ...................... 73/146.8; 73/744; 73/756
[58] Field of Search .................... 73/146.8, 756, 744

[56] References Cited

U.S. PATENT DOCUMENTS

| 3,696,668 | 10/1972 | Patrick | 73/146.8 |
| 4,028,936 | 6/1977 | Guy | 73/146.8 |

FOREIGN PATENT DOCUMENTS

| 1349402 | 12/1964 | France | 73/146.8 |
| 1024765 | 6/1983 | U.S.S.R. | 73/146.8 |

Primary Examiner—Donald O. Woodiel
Attorney, Agent, or Firm—Warren H. Kintzinger

[57] ABSTRACT

A universal refrigerant system gas pressure check gauge with a valve head opening about a valve pin within the valve head opening that is shaped to fit on and over the low pressure suction side valve fitting of a refrigeration system with the valve stem of the refrigeration system suction side valve fitting engaging and being depressed by the gauge valve pin to open the valve. A resiliently compressible washer is held in the gas pressure check gauge valve head opening with a center opening in the washer that does not close on the valve pin in order that refrigerant gas may pass on through into valve head and gauge stem internal passages. The resiliently compressible washer is of such thickness as to be engaged and resiliently compressed by the end of the refrigeration system suction side valve fitting as the valve stem is being depressed by the gauge valve pin thereby sealing the valve fitting to the check gauge to insure that refrigerant materials leak very little if at all. The rectangular gauge indicator stem has at least one side with indication pressure zones- low, norm, hi, danger, and hi-pressure that are color coded as well, along with at least one other side pressure indication numbered. A tire valve stem insert guide is provided for the check gauge that when placed in the check gauge converts the gauge from a refrigerant check gauge to a tire check gauge and at least one side of the gauge indicator stem is pressure numbered for use of the check gauge as a tire gauge.

9 Claims, 6 Drawing Figures

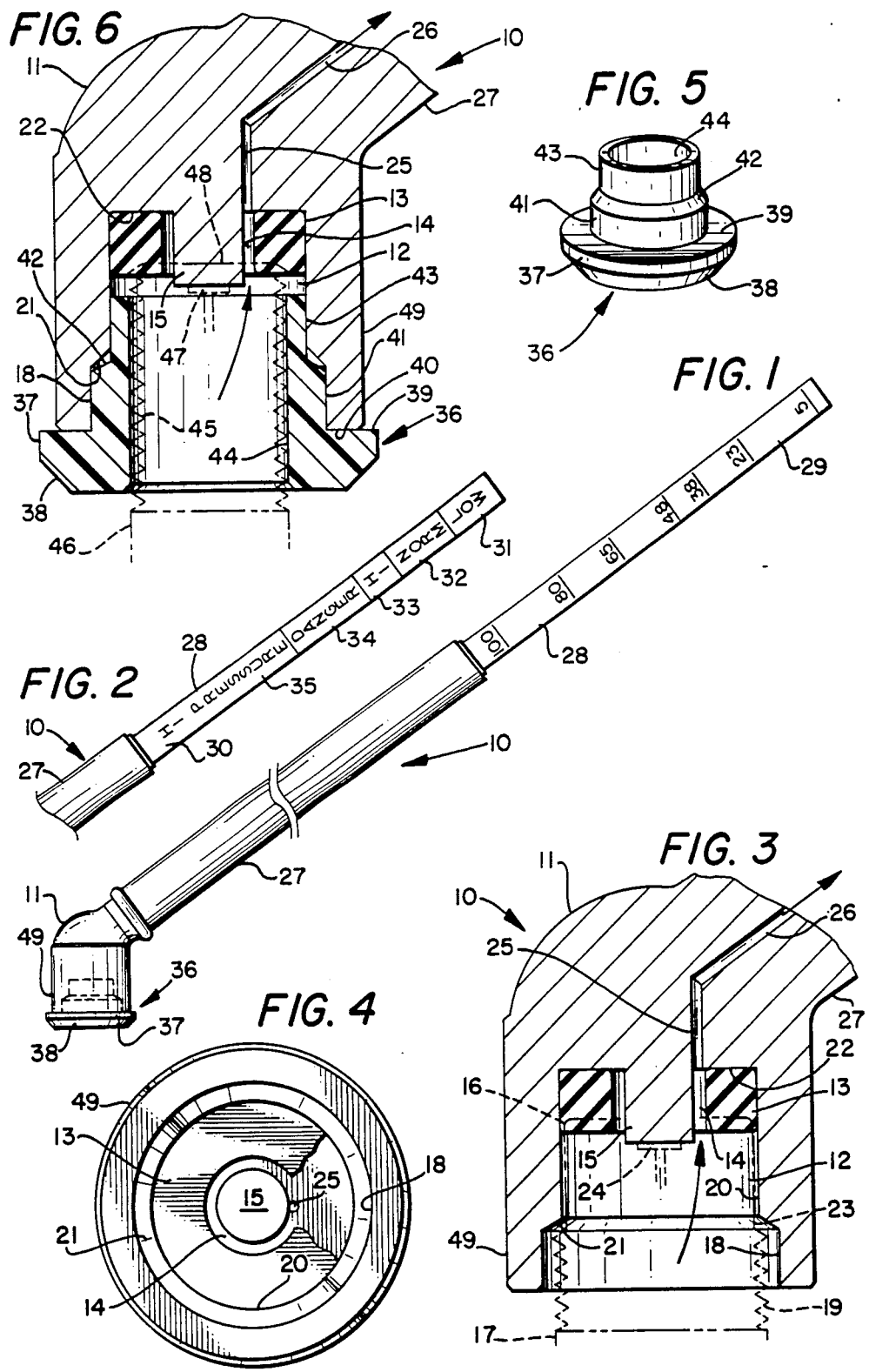

AIR CONDITIONER REFRIGERANT CHECK GAUGE INSERT CONVERTIBLE TO A TIRE CHECK GAUGE

This invention relates in general to gas pressure gauges such as a portable convenience tire pressure gauge, and more particularly, to a refrigerant system gas pressure checking gauge convertible with an insert to a tire pressure checking gauge.

Hertofore, special and expensive tools and equipment have been needed to check the refrigerant level pressure in car air conditioning systems and other air conditioning systems. Use of such equipment can be awkward and demanding, requiring skill, experience and more knowledge than most people have on the subject. Any improvement in checking the refrigerant level in air conditioiners and indication of when and how much refrigerant material to add is most welcome. This improvement is a pressure gauge like a tire pressure gauge equipped with a valve head opening about a valve pin within the valve head opening that is shaped to fit on and over the low pressure suction side valve fitting of a refrigeration system with the valve stem of the refrigeration system suction side valve fitting engaging and being depressed by the gauge valve pin to open the valve. A resiliently compressible washer is held in the gas pressure check gauge valve head opening with a center opening in the washer that does not close on the valve pin in order that refrigerant gas may pass on through into valve head and gauge stem internal passages. The resiliently compressible washer is of such thickness as to be engaged and resiliently compressed by the end of the refrigeration system suction side valve fitting as the valve stem is being depressed by the gauge valve pin thereby sealing the valve fitting to the check gauge to insure that refrigerant materials leak very little if at all. The rectangular gauge indicator stem has at least one side with indication pressure zones-low, norm, hi, danger, and hi-pressure that are colored as well, along with at least one other side pressure indication numbered. A tire valve stem insert guide is provided for the check gauge that when placed in the check gauge converts the gauge from a refrigerant check gauge to a tire check gauge and at least one side of the gauge indicator stem is pressure numbered for use of the check gauge as a tire gauge.

It is therefore a principal object of this invention to provide for easy quick safe pressure checking of air conditioner refrigerant systems with an easy to use, easy to read pressure checking gauge.

Another object is to provide a gauge with a valve head opening shaped to fit on and over the low pressure suction side valve of a refrigeration system.

A further object in providing such a refrigerant gas pressure gauge is to minimize loss of refrigerant gas while pressure checking with the gauge.

Still another object is to eliminate any need for expensive, complicated and hard to use refrigerant hose and dial gauge equipment for pressure checking.

Another object is to provide such a refrigerant material pressure gauge easily convertable to use as a tire pressure gauge merely by inserting an adapter in the gauge valve head.

Features of the invention useful in accomplishing the above objects include in an air conditioner system gas pressure gauge, a gas pressure check gauge with a rectangular gauge indicator stem having at least one side indicating pressure zones: low, norm, hi, danger, and hi-pressure that are color coded as well. At least one other side of the indicator stem is pressure numbered to indicate gas pressure, and, with a converter insert in place, at least one side of the stem is numbered for tire pressure. The gas pressure check gauge has a valve head with an opening that is shaped to fit on and over the low pressure suction side valve fitting of a refrigeration system with the valve stem of the refrigeration system suction side valve fitting engaging and being depressed by the gauge valve pin to open the valve. A resilinetly compressible washer is held in the gas pressure check gauge valve head opening with a center opening in the washer that does not close on the valve pin in order that refrigerant gas may pass on through into valve head and gauge stem internal passages. The resiliently compressible washer is of such thickness as to be engaged and resiliently compressed by the end of the refrigeration system suction side valve fitting as the valve stem is being depressed by the gauge valve pin thereby sealing the fitting to the check gauge to insure that refrigerant materials leak very little if at all.

A specific embodiment representing what is presently regarded as the best mode of carrying out the invention is illustrated in the accompanying drawing.

In the drawing:

FIG. 1 represents a perspective view of an air conditioner refrigerant gas pressure check gauge with a rectangular indicator stem having prssure zone indications: low, norm, hi, danger, and hi-pressure that are color coded as well, and with a tire valve stem insert guide in place in the gauge valve head that converts the gauge from a refrigerant check gauge to a tire check gauge;

FIG. 2, a partial view of the gauge showing the extended stem from an other side from the showing of FIG. 1;

FIG. 3, a broken away and sectioned side elevation view of the gauge valve head without the tire valve stem insert guide;

FIG. 4, a bottom, or open end, view of the gauge valve head of FIG. 3;

FIG. 5, a perspective view of tire valve stem insert guide, and

FIG. 6, a broken away and sectioned side elevation view, like FIG. 3, of the gauge valve head with the tire valve stem insert guide inserted in place therein.

Referring to the drawing:

The universal air conditioner refrigerant pressure gauge 10, as shown in FIGS. 1, and 3-6, is shown to have a valve head 11 with an enlarged opening 12 containing a resiliently compressible washer 13 in the bottom thereof. The resiliently compressible washer 13, that is larger in diameter than its tire valve counterpart, has a center opening 14 that does not close on valve pin 15 even when the washer 13 is compressed by bearing pressure thereon of the nose end 16 of a refrigeration system suction side valve fitting 17. The opening 12 is sized and shaped to receive and guide the fitting 17 with an enlarged end section 18 giving clearance to an end portion of fitting threads 19 and a smaller diameter portion 20 extended from a beveled transition 21 to the bottom 22 holding washer 13 and receiving and guiding the nose portion 23 of fitting 17. The valve pin 15 is so positioned and of such length as to effectively contact and push the valve stem 24 of the valve fitting 17(that may be a Shroeder valve) into an interior opening of the fitting 17 to open the valve. This is accomplished simultaneously with resilient compression of washer 13 as the refrigerant pressure check gauge 19 is pushed toward the refrigeration valve fitting 17 after the fitting nose portion 23 and a portion of fitting threads 19 have been received in valve head opening 12. An internal passage 25 in valve head 11 extends from the space between washer opening 14 and valve pin 15 to passage extension 26 angled to the cylindrical housing 27, extended from the gauge valve head 11, that contains rectangular gauge indicator stem 28. The rectangular stem 28, as shown in FIG. 2, has, in addition to at least one pressure numbered side 29, pressure zoned side 30 with low 31, norm 32, hi 33, danger 34, and hi-pressure 35 zones that are colored, respectively, blue, green yellow, red and white as well.

The tire valve stem guide insert 36 of FIG. 5 is provided for converting the pressure check gauge 10 from a refrigerant pressure check gauge for automotive air conditioners to a tire check gauge. The insert 36 is formed with an enlarged outer head 37, beveled 38 on the outside, a shoulder 39 on on the underside of the head 37 that contacts end 40 of valve head 11, a cylindrical shank 41 that fits the enlarged end opening section 18, a bevel transition 42 to a smaller diameter extension 43 that fits the main portion of opening 12, and a cylindrical through end to end opening 44. Opening 44 through insert 36 is sized to be a guide for tire valve stem threaded end 45 insertion therein to aligned contact with valve pin 15 of the prssure gauge 10. With pushing of the gauge down on a tire valve stem 46 of the valve pin 15 effectively pushes the valve stem pin 47 inward to open the tire valve along with simultaneous resilient compression of washer 13 by the end 48 of the tire valve stem threaded end 45. The tire valve stem guide insert 36 that is a snug holding fit in opening 12 may be made of metal or molded of plastic that is relatively stiff. It should be noted further, that the enlarged outer head 37 shoulder 39 extends radially outward beyond the adjacent circumferential periphery of the gauge valve head opening 12 projection 49. This facilitate manual removal of insert 36 and conversion of the gauge back to the air conditioner refrigerant check state.

The universal air conditioner refrigerant gas pressure gauge 10 is useable for all automotive air conditioner units without sight glasses in units generally having rotary compressors. It should be noted that all automotive units with sight gauges and/or piston compressors the equilavent pressure ranges are approximately ten pounds lower on the low pressure suction side valve fitting. The gauge 10 accurately indicates the refrigerant charge level in your air conditioner and when, and generally how much, refrigerant should be added when needed.

Whereas this invention has been described particularly with respect to a single embodiment thereof, it should be realized that various changes may be made without departure from the essential contributions to the art made by the teaching hereof.

I claim:

1. A refrigerant system pressure check gauge comprising: a refrigerant system gas pressure check gauge with a valve head having a valve head opening that fits on and over a refrigeration system valve; a valve pin within said valve head opening positioned to engage and depress a valve stem pin of said refrigeration system valve to open the valve; a resiliently compressible washer, mounted in said valve head opening, and having a center opening sufficiently larger than said valve pin as to not close on said valve pin in order that gas under pressure may pass on through into the valve head; said resiliently compressible washer being so positioned and of such thickness as to be engaged and resiliently compressed by the outher end of said refrigeration system valve as a valve stem pin is being depressed by said valve pin to open said refrigeration system valve; and with said valve pin positioned to engage the said valve stem pin of the refrigeration system valve fitting so that as the pressure gauge is pushed toward the refrigerant valve sitting received in said gauge valve head opening the refrigeration system valve is opened and refrigeration material gases pass from the refrigeration system through internal opening passage means through the pressure gauge to provide a refrigerant gas charge pressure reading for the refrigerant system; wherein a tire valve stem insert guide is provided that is a snug fit in said valve head opening for converting said pressure check gauge from a refrigerant system pressure check gauge to a tire pressure check gauge; and a cylindrically walled insert guide opening through said insert guide with said guide opening sized and centered to be a guide for tire valve stem threaded end insertion to aligned contact of the tire valve stem pin with said valve pin; said resiliently compressible washer is so positioned and of such thickness as to be engaged and resiliently compressed by the outer end of said tire valve stem as the valve stem pin is being depressed by said valve pin to open said tire air valve; said valve pin is positioned to engage said tire valve stem pin of a tire valve so that as the gas pressure gauge is pushed toward the tire valve stem received in said insert guide opening in the insert held in said gauge valve head opening the tire valve is opened for passage of air under tire pressure to and through internal passage means in the pressure gauge to provide an air pressure reading for tire air pressure; said valve stem insert guide is formed with an enlarged outer head with a shoulder that contacts the end of a gauge valve head opening projection having a circumferential periphery; and with said shoulder extending radially outward beyond the circumferential periphery of said gauge valve head opening projection that facilitates manual removal of said insert guide for conversion of the gauge back to the air conditioner refrigerant pressure check state.

2. The gas pressure check gauge of claim 1, wherein said valve head opening in said gauge valve head opening projection is formed with an enlarged end opening section for clearance to valve fitting threads; a smaller diameter section interconnected with said enlarged end opening section via a beveled truncated cone transition section as a guide to insertion of the outer nose end of a refrigeration system valve.

3. The gas pressure check gauge of claim 2, wherein said valve stem insert guide is also formed with an enlarged cylindrical shank that fits said enlarged end opening section of said gauge valve head opening; an insert cylindrical extension that fits said smaller diameter section of the gauge valve head opening; and a truncated cone beveled transition section interconnecting said enlarged cylindrical shank and said insert cylindrical extension as an aid to insertion of said valve stem insert guide into said gauge valve head opening.

4. A refrigerant system pressure check gauge comprising: a refrigerant system gas pressure check gauge with a valve head having a valve head opening that fits on and over a refrigeration system valve; a valve pin within said valve head opening positioned to engage and depress a valve stem pin of said refrigeration system valve to open the valve; a resiliently compressible washer, mounted in said valve head opening, and having a center opening sufficiently larger than said valve pin as to not close on said valve pin in order that gas under pressure may pass on through into the valve head; said resiliently compressible washer being so positioned and of such thickness as to be engaged and resiliently compressed by the outer end of said refrigeration system valve as a valve stem pin is being depressed by said valve pin to open said refrigeration system valve; and with said valve pin positioned to engage the said valve stem pin of the refrigeration system valve fitting so that as the pressure gauge is pushed toward the refrigerant valve fitting received in said gauge valve head opening the refrigeration system valve is opened and refrigeration material gases pass from the refrigeration system through internal opening passage means through the pressure gauge to provide a refrigerant gas charge pressure reading for the refrigerant system; wherein a tire valve stem insert guide is provided that is a snug fit in said valve head opening for converting said pressure check gauge from a refrigerant system pressure check gauge to a tire pressure check gauge; and a cylindrically walled insert guide opening through said insert guide with said guide opening sized and centered to be a guide for tire valve stem threaded end insertion to aligned contact of the tire valve stem pin with said valve pin; said valve stem insert guide is formed with an enlarged outer head with a shoulder that contacts the end of a gauge valve head opening projection having a circumferential periphery; and with said shoulder extending radially outward beyond the circumferential periphery of said gauge valve head opening projection that facilitates manual removal of said insert guide for conversion of the gauge back to the air conditioner refrigerant pressure check state.

5. The gas pressure check gauge of claim 4, wherein said valve head opening in said gauge valve head opening projection is formed with an enlarged end opening section for clearance to valve fitting threads; a smaller diameter section interconnected with said enlarged end opening section via a beveled truncated cone transition section as guide to insertion of the outer nose end of a refrigeration system valve.

6. The gas pressure check valve of claim 5, wherein said valve stem insert guide is also formed with an enlarged cylindrical shank that fits said enlarged end opening section of said gauge valve head opening; an insert cylindrical extension that fits said smaller diameter section of the gauge valve head opening; and a truncated cone beveled transition section interconnecting said enlarged cylindrical shank and said insert cylindrical extension as an aid to insertion of said valve stem insert guide into said gauge valve head opening.

7. The gas pressure check gauge of claim 6, wherein said check gauge includes a cylinder housing containing a gauge valve stem subject to being driven outward from a retracted state to various degrees of distance up to a fully extended state dependent on the gas pressure being measured by the check valve; and wherein said gauge valve stem has pressure graduation markings on at least one side.

8. The gas pressure check gauge of claim 7, wherein said gauge valve stem is provided with prssure zone markings for checking refrigerant charge of air conditioners including pressure zone markings: low, norm, hi, danger and hi-pressure.

9. The gas pressure check gauge of claim 8, wherein said gauge is also useful as a tire air pressure gauge when said adapter is inserted in said valve head opening.

* * * * *

UNITED STATES PATENT AND TRADEMARK OFFICE
CERTIFICATE OF CORRECTION

PATENT NO. : 4,693,112
DATED : September 15, 1987
INVENTOR(S) : James E. Ferris

It is certified that error appears in the above-identified patent and that said Letters Patent is hereby corrected as shown below:

On the title page insert Related U.S. Application Data

-- Continuation-in-Part of application Serial No. 740,478, now United States Patent No. 4,599,903 --.

Column 1, below the title insert --This is a continuation-in-part of application Serial No. 740,478, now United States Patent No. 4,599,903--.

Signed and Sealed this

Twelfth Day of April, 1988

Attest:

DONALD J. QUIGG

*Attesting Officer*    Commissioner of Patents and Trademarks